(12) United States Patent
Chatcavage et al.

(10) Patent No.: US 6,992,785 B1
(45) Date of Patent: Jan. 31, 2006

(54) METHOD, DATA STRUCTURE AND APPARATUS FOR IDENTIFYING RESOURCES PRIOR TO PRINTING

(75) Inventors: Edward F. Chatcavage, Longmont, CO (US); Reinhard H. Hohensee, Boulder, CO (US); Guy L. Johnston, Broomfiled, CO (US); Ronald D. Parrish, Niwot, CO (US); Arthur R. Roberts, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,725

(22) Filed: Feb. 9, 2000

(51) Int. Cl.
*G06F 15/00* (2006.01)
*G06F 9/455* (2006.01)

(52) U.S. Cl. ............... 358/1.15; 358/1.15; 718/102
(58) Field of Classification Search ............... 358/1.12, 358/1.13, 1.15, 1.11, 1.2, 1.14; 709/102; 718/102
See application file for complete search history.

(56) References Cited

U.S. PATENT DOCUMENTS

| 5,025,398 | A |   | 6/1991  | Nelson |
|-----------|---|---|---------|--------|
| 5,446,837 | A |   | 8/1995  | Motoyama et al. |
| 5,469,532 | A | * | 11/1995 | Gerlach et al. ............. 358/1.2 |
| 5,469,533 | A |   | 11/1995 | Dennis |
| 5,471,564 | A | * | 11/1995 | Dennis et al. ............. 358/1.15 |
| 5,671,445 | A |   | 9/1997  | Gluyas et al. |
| 6,407,821 | B1| * | 6/2002  | Hohensee et al. ......... 358/1.15 |
| 6,538,760 | B1| * | 3/2003  | deBry et al. ............. 358/1.15 |

* cited by examiner

*Primary Examiner*—Kimberly Williams
*Assistant Examiner*—Saeid Ebrahimi-Dehkordy
(74) *Attorney, Agent, or Firm*—Chambliss, Bahner & Stophel, P.C.; David W. Lynch

(57) ABSTRACT

A data structure, document data stream, method and apparatus for identifying resources prior to printing. A print data stream structure is provided that can be specified at the beginning of a document or job, or on any page boundary in a document or job, and that identifies complex resources that are required by the pages that follow. This structure is processed by a print server, which uses the resource references to download any missing resources before printing of the following pages is started. Accordingly, print underruns are avoided by ensuring that complex resources are downloaded to the printer before the first page is initiated.

26 Claims, 6 Drawing Sheets

METHOD, DATA STRUCTURE AND APPARATUS FOR IDENTIFYING RESOURCES PRIOR TO PRINTING

BACKGROUND OF THE INVENTION

1. Field of the Invention

This invention relates in general to printing systems, and more particularly to a method, data structure and apparatus for identifying resources prior to printing.

2. Description of Related Art

Print systems include presentation architectures, which are provided for representing documents in a data format that is independent of the methods utilized to capture or create those documents. One example of an exemplary presentation system, which will be described herein, is the AFP™ (Advanced Function Presentation) system developed by International Business Machines Corporation. However, those skilled in the art will recognize that the present invention is not meant to be limited to the AFP™ system, but rather the AFP™ system is presented herein as merely one example of a presentation system applicable to the principles of the present invention.

According to the AFP™ system, documents may contain combinations of text, image, graphics, and/or bar code objects in device and resolution independent formats. Documents may also contain and/or reference fonts, overlays, and other resource objects, which are required at presentation time to present the data properly. Additionally, documents may also contain resource objects, such as a document index and tagging elements supporting the search and navigation of document data for a variety of application purposes. In general, a presentation architecture for presenting documents in printed format employs a presentation data stream. To increase flexibility, this stream can be further divided into a device-independent application data stream and a device-dependent printer data stream. A data stream is a continuous ordered stream of data elements and objects that conform to a given formal definition. Application programs can generate data streams destined for a presentation device, archive library, or another application program. The Mixed Object Document Content Architecture (MO:DCA)™ developed by International Business Machines Corporation of Armonk, N.Y. defines a data stream, which may be utilized by applications to describe documents and object envelopes for document interchange and document exchange with other applications and application services. Interchange is the predictable interpretation of shared information in an environment where the characteristics of each process need not be known to all other processes. Exchange is the predictable interpretation of shared information by a family of system processes in an environment where the characteristics of each process must be known to all other processes.

A mixed object document is a collection of data objects that comprise the document's content and the resources and formatting specifications that dictate the processing functions to be performed on that content. The term "Mixed" in the Mixed Object Document Content Architecture (MO:DCA)™ refers to both the mixture of data objects and the mixture of document constructs that comprise the document's components. A Mixed Object Document Content Architecture (MO:DCA)™ document can contain a mixture of resource objects types, which each have a unique processing requirement. The Mixed Object Document Content Architecture (MO:DCA)™ is designed to integrate the different data object types into documents that can be interchanged as a single data stream and provides the data stream structures needed to carry the data objects. The MO:DCA™ data stream also provides syntactic and semantic rules governing the use of objects to ensure different applications process objects in a consistent manner.

In its most complex form a Mixed Object Document Content Architecture (MO:DCA)™ document contains data and resource objects along with data structures which define the document's layout and composition features. This form is called a Mixed Object Document Content Architecture (MO:DCA)™ presentation document. Within such a data stream the Mixed Object Document Content Architecture (MO:DCA)™ components are defined with a syntax that consists of self-describing structures called structured fields. Structured fields are the main Mixed Object Document Content Architecture (MO:DCA)™ structures and are utilized to encode Mixed Object Document Content Architecture (MO:DCA)™ commands. A structured field starts with an introducer that uniquely identifies the command, provides a total length for the command, and specifies additional control information such as whether padding bytes are present. The introducer is then followed by data bytes. Data may be encoded within the structured field utilizing fixed parameters, repeating groups, key words, and triplets. Fixed parameters have a meaning only in the context of the structure that includes them. Repeating groups are utilized to specify grouping of parameters that can appear multiple times. Key words are self-identifying parameters that consist of a one byte unique key word identifier followed by a one byte keyword value. Triplets are self-identifying parameters that contain a length field, a unique triplet identifier, and data bytes. Key words and triplets have the same semantics wherever they are utilized. Together these structures define a syntax for Mixed Object Document Content Architecture (MO:DCA)™ data streams which provide for orderly parsing and flexible extendibility.

The document is the highest level within the Mixed Object Document Content Architecture (MO:DCA)™ data stream document component hierarchy. Documents may be constructed of pages, and the pages, which are at the intermediate level, may be made up of data objects. Data objects are at the lowest level and can be bar code objects, graphics objects, image objects and presentation text.

Multiple documents may be collected into a print file. A print file may optionally contain, at its beginning, an "inline" resource group that contains resource objects required for print. Alternatively, the resource objects may be stored in a resource library that is accessible to the print server, or they may be resident in the printer.

A Mixed Object Document Content Architecture (MO:DCA)™ document in its presentation form is a document which has been formatted and is intended for presentation, usually on a printer or a display device. A data stream containing a presentation document should produce the same document content in the same format on different printers or display devices, dependent on the capabilities of each of the printers or display devices. A presentation document can reference resources that are to be included as part of the document to be presented, which are not present within the document as transmitted within the MO:DCA™ data stream.

Pages within the Mixed Object Document Content Architecture (MO:DCA)™ are the level within the document component hierarchy which is utilized to print or display a document's content. Each page has associated environment information that specifies page size and that identifies resources required by the page. This information is carried in a MO:DCA™ structure called an Active Environment Group (AEG). Data objects contained within each page envelope in the data stream are presented when the page is presented. Each data object has associated environment information that directs the placement and orientation of the data on the page, and that identifies resources required by the object. This information is carried in a MO:DCA™ structure called an Object Environment Group (OEG).

Delimiters that identify the object type, such as graphics, image or text, bound objects in the data stream. In general, data objects consist of data to be presented and the directives required to present it. The content of each type of data object is defined by an object architecture that specifies presentation functions, which may be utilized within its coordinate space. All data objects function as equals within the Mixed Object Document Content Architecture (MO:DCA)™ data stream environment. Data objects are carried as separate entities in the Mixed Object Document Content Architecture (MO:DCA)™ data stream.

Resource objects are named objects or named collection of objects that can be referenced from within the document. In general, referenced resources can reside in an inline resource group that precedes the document in the MO:DCA™ data stream or in an external resource library and can be referenced multiple times. Resource objects may need to be utilized in numerous places within a document or within several documents.

An object container within the Mixed Object Document Content Architecture (MO:DCA)™ is an envelope for object data that is not necessarily defined by an International Business Machines Corporation presentation architecture and that might not define all required presentation parameters. The container consists of a mandatory Begin/End structured field pair, an optional Object Environment Group (OEG) and mandatory Object Container Data (OCD) structured fields. If an object is to be carried in Mixed Object Document Content Architecture (MO:DCA)™ resource groups and interchanged, it must, at a minimum, be enveloped by a Begin/End pair. The Object Classification triplet on the Begin structured field must specify the registered object identifier (OID) for the object data format, and the data must be partitioned into OCD structured fields.

A printer data stream within a presentation architecture is a device-dependant continuous ordered stream of data elements and objects conforming to a given format, which are destined for a presentation device. The Intelligent Printer Data Stream (IPDS)™ architecture developed by International Business Machines Corporation and disclosed within U.S. Pat. No. 4,651,278, which is incorporated herein by reference, defines the data stream utilized by print server programs and device drivers to manage all-points-addressable page printing on a full spectrum of devices from low-end workstation and local area network-attached printers to high-speed, high-volume page printers for production jobs, Print On Demand environments, shared printing, and mailroom applications. The same object content architectures carried in a MO:DCA™ data stream are carried in an IPDS™ data stream to be interpreted and presented by microcode executing in printer hardware. The IPDS™ architecture defines bi-directional command protocols for query, resource management, and error recovery. The IPDS™ architecture also provides interfaces for document finishing operations provided by pre-processing and post-processing devices attached to IPDS™ printers.

The IPDS™ architecture incorporates several important features. As noted above, since the IPDS™ architecture supports the same objects as those carried by the MO:DCA™ data stream, the IPDS™ architecture enables the output of multiple diverse applications to be merged at print time so that an integrated mixed-data page, including text, images, graphics, and bar code objects, results. The IPDS™ architecture transfers all data and commands through self-identifying structured fields that describe the presentation of the page and provide for dynamic management of resources, such as overlays, page segments and fonts as well as the comprehensive handling of exception conditions. Furthermore, the IPDS™ architecture provides an extensive acknowledgement protocol at the data stream level, which enables page synchronization of the host (e.g., print server) and printer processes, the exchange of query-reply information, and the return to the host of detailed exception information.

As can be seen, print data streams reference resources, such as images and fonts, that are required for presentation. Further, these resources are typically referenced in the print stream at the point that they are required. For example, in an AFP (MO:DCA)™ print file, each page identifies the resources that are required to print the page in the Active Environment Group (AEG) that is part of the page object as discussed above. However, in PostScript™ and PDF files, resources may be identified anywhere in the file.

Such resource identification places a burden on the print system in that it requires 'real-time' downloading and processing of the resource. For example, assume an image I1 is required on page P1. If I1 is identified as part of P1, then, assuming I1 is not present in the printer, I1 must be downloaded with the P1 page data. The download time therefore takes up part of the P1 print window. This works without a print-underrun as long as the print window is large enough to accommodate the I1 transmission time.

The largest print resources are normally raster images. When the images are monochrome (1 bit per image point), current technologies are capable of processing pages along with their images at reasonably high speeds. However, when the images are color (24 bits per image point or even 32 bits per image point), at high resolution (e.g. 600 dpi), the image transmission time can no longer be tolerated in the print window, and print underruns result, i.e., the printer is ready to print a page, but lacks at least a resource that is to be printed. Some printers are incapable of stopping the paper path on-the-fly, which results in blank pages. This means that not only is paper wasted, but more importantly blank pages appear randomly inserted in the job output.

For example, an 8×10 CMYK (Cyan, Magenta, Yellow and BlacK) color image, at 600 dots per inch (dpi), JPEG compressed with a compression ratio of 10:1, still contains about 10 MB (megabytes) of data. If the typical attachment bandwidth is 2.5 MB/sec between the printing system and the server containing the image, 4 seconds are required just to download the image from the server to the printing system. While page and resource buffering in the printer can save some of this time, it is clearly incompatible with a print window of 0.5 seconds/page (for a 120 ppm printer).

One solution to this problem involves the use of a printer structure called a collator. The complete print file is first downloaded to the printer and then processed by the raster image processor into print-ready format. Once in this format, any number of copies of the file are generated out of the collator without requiring any transmission between print server and printer. The problem with this solution is that it does not allow real-time printing. Moreover, a huge time delay is incurred before the first copy of the first page is printed. In addition, it requires a very large amount of (expensive) disk space in the printer for the collator function.

U.S. Pat. No. 5,469,533, issued Nov. 21, 1995 to Stephen V. Dennis and assigned to Microsoft Corporation, discloses a printer system that includes a resource assembler that examines a complete document in whatever format the document is generated. Then, the resource assembler determines all of the resources that are required to print the entire document. However, as the document becomes large, identifying all of the resources prior to beginning printing is too time consuming to be practical. Further, additional processing is needed to analyze the generated document and to identify all resources for the entire document.

It can be seen that there is a need for a method, data structure and apparatus that enables early identifying of resources to improve print speed and efficiency.

It can also be seen that there is a need for a method, data structure and apparatus that avoids print underruns by ensuring that complex resources are downloaded to the printer before the first page is initiated.

It can also be seen that there is a need for a method, data structure and apparatus that provides a structure at the beginning of a document description or at the beginning of a group of pages that identifies any complex resources required by the pages that follow.

SUMMARY OF THE INVENTION

To overcome the limitations in the prior art described above, and to overcome other limitations that will become apparent upon reading and understanding the present specification, the present invention discloses a method, data structure and apparatus for identifying resources prior to printing.

The present invention solves the above-described problems by providing a structure at the beginning of a document description that identifies any complex resources required by the document. Accordingly, print underruns are avoided by ensuring that complex resources are downloaded to the printer before the first page of the job is initiated.

A data structure in accordance with the principles of the present invention is disposed before a page in a document data stream for referencing and identifying resource objects, the data structure providing an indication of resource objects to be made available in the printer prior to attempting to print the page.

Other embodiments of a data structure, method and system in accordance with the principles of the invention may include alternative or optional additional aspects. One such aspect of the present invention is the data structure is disposed at a beginning of a document before a first page to provide an indication of all resource objects that will be needed to print the document.

Another aspect of the present invention is that all of the resource objects of the document are made available in the printer prior to attempting to print the first page.

Another aspect of the present invention is that a method of printing is provided that includes receiving a print request for printing a document, generating a presentation data stream defining the document, the presentation data stream including at least one page group, the page group defining at least one page for printing and placing a resource environment group before a page group, the resource environment group referencing and identifying resource objects for at least the page group, the resource environment group providing an indication of resource objects to be made available in the printer prior to attempting to print the at least one page group.

Another aspect of the present invention is that the page group included fields for defining a single page.

Another aspect of the present invention is that the page group includes fields for defining a plurality of pages.

Another aspect of the present invention is that the resource environment group references and identifies resource objects for all page groups in the document.

Another aspect of the present invention is that the placing includes placing an Nth resource environment group before an Nth page group.

Another aspect of the present invention is that the method further includes reading the resource environment group and ensuring all resource objects identified by the resource environment group are available to the printer before printing pages associated with the resource environment group.

Another aspect of the present invention is that the ensuring includes downloading any resources mapped by the resource environment group that are not resident at the printer.

Another aspect of the present invention is that a method of printing is provided that includes receiving a print data stream, determining whether the print data stream includes a resource environment group, downloading resource objects mapped by the resource environment group when the print data stream includes a resource environment group, and printing the pages defined by the print data stream.

Another aspect of the present invention is that the determining further includes determining whether the print data stream includes an Nth resource environment group associated with an Nth page group and the downloading further includes downloading resource objects for the Nth page group mapped by the Nth resource environment group when the print data stream includes an Nth resource environment group associated with an Nth page group.

Another aspect of the present invention is that a system for printing is provided that includes a document generator for generating a presentation data stream defining the document, the presentation data stream including at least one page group, the page group defining at least one page for printing and including a resource environment group before a page group, the resource environment group referencing and identifying resource objects for at least the page group, the resource environment group providing an indication of resource objects to be made available prior to attempting to print the at least one page group, a print server, coupled to the document generator, the print server determining whether the print data stream includes a resource environment group and downloading resource objects mapped by the resource environment group when the print data stream includes a resource environment group and a control unit, coupled to the print server, for printing the document using the resource objects downloaded by the print server.

Another aspect of the present invention is that the print server determines whether the print data stream includes an Nth resource environment group associated with an Nth page group and downloads resource objects for the Nth page group mapped by the Nth resource environment group when the print data stream includes an Nth resource environment group associated with an Nth page group.

Another aspect of the present invention is that an article of manufacture is provided that includes a program storage medium readable by a computer. The medium tangibly embodies one or more programs of instructions executable by the computer to perform a method for printing that includes receiving a print request for printing a document, generating a presentation data stream defining the document, the presentation data stream including at least one page group, the page group defining at least one page for printing and placing a resource environment group before a page group, the resource environment group referencing and identifying resource objects for at least the page group, the resource environment group providing an indication of resource objects to be made available prior to attempting to print the at least one page group.

Another aspect of the present invention is that an article of manufacture is provided that includes a program storage medium readable by a computer. The medium tangibly embodies one or more programs of instructions executable by the computer to perform a method for printing that includes receiving a print data stream, determining whether the print data stream includes a resource environment group, downloading resource objects mapped by the resource environment group when the print data stream includes a resource environment group and printing the pages defined by the print data stream.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention defines a print data stream structure that can be specified at the beginning of a document or job, or on any page boundary in a document or job, and that identifies complex resources that are required by the pages that follow. This structure is processed by a print server, which uses the resource references to download any missing resources before printing of the following pages is started. Accordingly, print underruns are avoided by ensuring that complex resources are downloaded to the printer before the first job is initiated.

Figure 1:
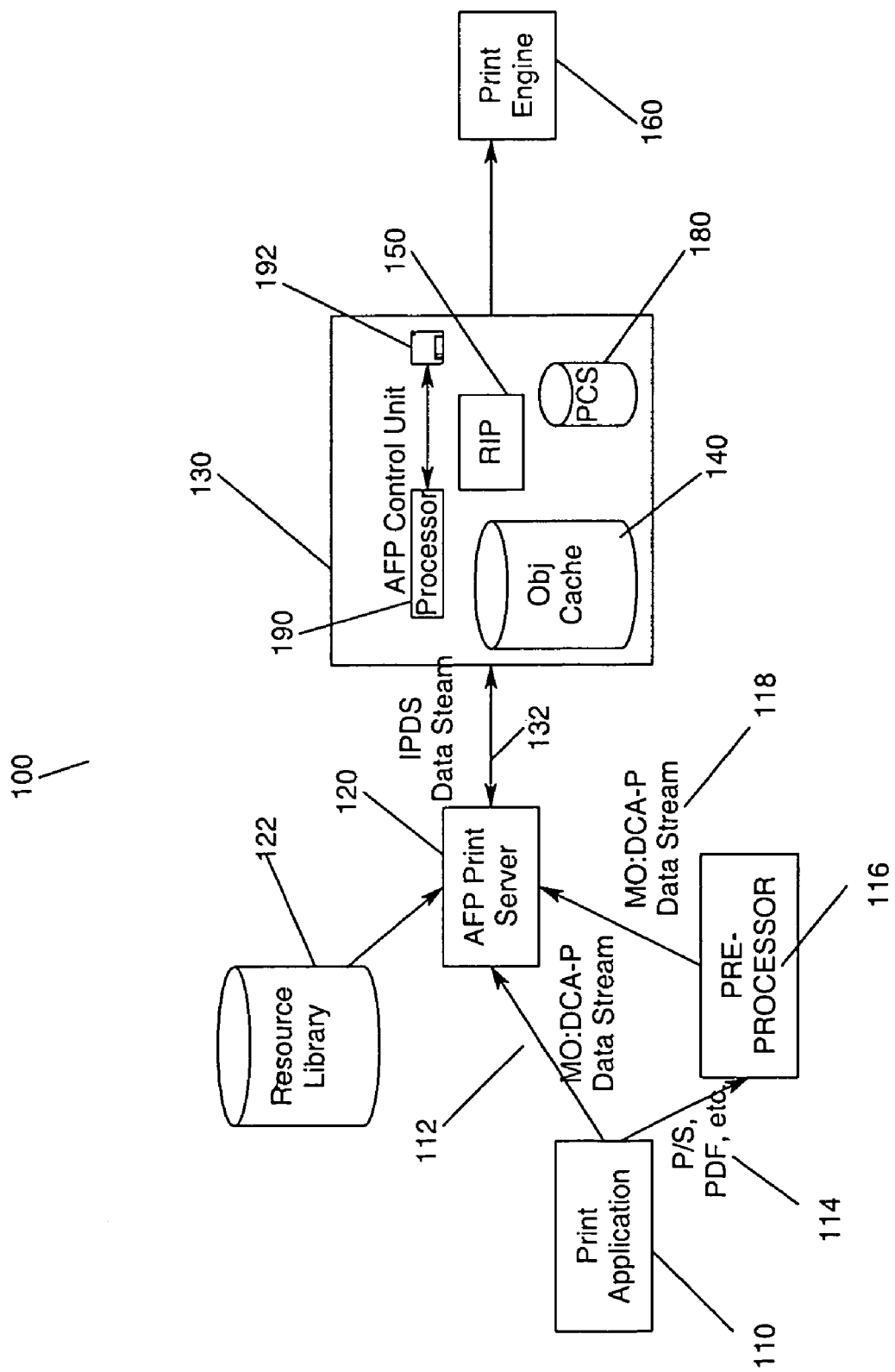
FIG. 1 illustrates an Advanced Function Presentation (AFP™) printing system according to the present invention.

FIG. 1 illustrates an Advanced Function Presentation (AFP) printing system 100 according to the present invention. In FIG. 1, a print application 110 makes a request for the printing of a document. The print application 110 provides a Mixed Object Document Content Architecture (MO:DCA)™ data stream 112 to the AFP print server 120, also called the Print Service Facility (PSF™).

The print application 110 may also provide PostScript (P/S) and PDF files 114 for printing. PostScript (P/S) and PDF files 114 are printed by first passing them through a pre-processor 116. The pre-processor 116 creates resource separation and page independence so that the P/S or PDF file can be transformed into an AFP (MO:DCA)™ data stream 118, which is then passed to the AFP print server 120.

The AFP (MO:DCA)™ data streams 112, 118 are object-oriented streams consisting of, among other things, data objects, page objects, and resource objects. The pre-processor 116 creates simplified, sequential P/S or PDF page objects that preserve the graphics page content, and resource objects that are required to print the page content. These objects are then wrapped into the appropriate AFP structures and embedded in an AFP print file. In accordance with this invention, the pre-processor filters out or 'sidelines' complex, multi-use resources and builds a AFP (MO:DCA)™ data stream 118 according to the present invention.

AFP (MO:DCA)™ data streams 112, 118, according to the present invention, contain a Resource Environment Group (REG), that is specified at the beginning of the AFP document, before the first page. When the AFP (MO:DCA)™ data streams 112, 118 are processed by an AFP print server 120, the REG structure is encountered first and causes the server to download any of the identified resources that are not already present in the printer. This occurs before paper is moved for the first page of the job. When the pages that require the complex resources are eventually processed, no additional download time is incurred for these resources.

The resource library 122 provides resource objects to the AFP print server 120. The AFP (MO:DCA)™ data streams 112, 118 are provided according to a device-independent page description language (PDL). The AFP print server 120 processes pages of output that mix all of the elements normally found in presentation documents, e.g., text in typographic fonts, electronic forms, graphics, image, lines, boxes, and bar codes. The AFP (MO:DCA)™ data stream is composed of architected, structured fields that describe each of these elements.

The AFP print server 120 communicates with an AFP control unit 130 via an Intelligent Printer Data Stream (IPDS™) 132. The IPDS™ data stream 132 is similar to the AFP data steam, but is built specific to the destination printer in order to integrate with each printer's specific capabilities and command set, and to facilitate the interactive dialog between the PSF and the printer. The IPDS™ data stream 132 may be built dynamically at presentation time, i.e., on-the-fly in real time. Thus, the IPDS™ data stream is provided according to a device-dependent bi-directional command/data stream.

The AFP control unit 130 includes a cache 140 for maintaining cached objects and a raster image processor 150. AFP files are converted into IPDS™ by the AFP print server 120, and page objects are rendered by the RIP 150. The AFP control unit 130 provides sheet maps for printing to a print engine 160. Objects are captured and stored in the printer capture storage 180. The AFP control unit 130 may include a processor 190 that may be configured by program storage medium 192. The medium tangibly embodies one or more programs of instructions executable by the processor to perform the methods illustrated with reference to FIGS. 3 through 6 below. Those skilled in the art will recognize that the processor 190 may alternatively reside in the AFP print server 120 or may be coupled to both the AFP print server 120 and the AFP control unit 130.

To optimize the management of complex resources AFP architecture extensions are used. In this manner, complex objects can be treated as resources that are downloaded once and can be re-used multiple times by multiple documents and print servers. Resources can be assigned globally-unique identifiers that are platform-independent. This allows data streams to be created that are platform-independent and that guarantee the integrity of object identification. Multi-use resources can be captured in the printer and maintained across PSF sessions and printer power cycles. Further, a captured object can be re-used at a different position, clipping, orientation, and size.

To identify objects, objects are assigned unique identifiers called Object Identifiers (OIDs). In a MO:DCA™ (AFP) data stream, OIDs are carried in syntax structures called Fully Qualified Name (FQN) triplets, which are used to reference and identify objects. U.S. Pat. No. 5,813,020, issued Sep. 22, 1998, to Hohensee et al., and which is assigned to International Business Machines Corporation, Armonk, N.Y., and which is incorporated herein by reference, discloses a method and system for managing a presentation data stream which includes an ordered stream of uniquely identified data objects and associated elements which specify format and presentation parameters for those data objects for utilization within a specified application. For example, an OID may be represented using a syntax within structured fields that is based on the ISO Basic Encoding Rules and is defined in ISO/IEC 8825:1990(E).

Figure 2:
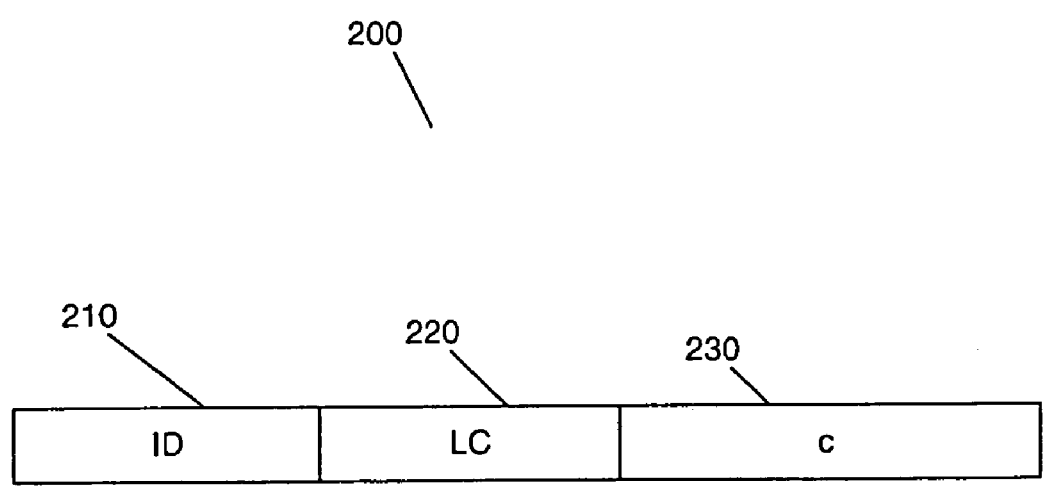
FIG. 2 illustrates one embodiment of an OID.

FIG. 2 illustrates one embodiment of an OID 200. The OID includes the identifier byte 210, the length of content byte 220 and the content 230. However, those skilled in the art will recognize that the present invention is not meant to be limited to the particular syntax illustrated in FIG. 2. Rather, the syntax structure shown in FIG. 2 is merely one example of a syntax structure for an OID.

According to the present invention, high-speed color printing is enabled by managing complex resources in a way that ensures resources are present in the device when they are required by an AFP page. Two conceptual methods are provided in a printer for holding downloaded resources: caching and capturing. Whenever a resource is downloaded from the print server to the printer, it is cached. This means that the resource is available in the printer for the duration of the job, but probably no longer than that. In addition, cached resources are deleted when the server session ends, and when the printer is powered down or re-started.

Capturing overcomes the temporary nature of caching. Once an object is captured, it becomes a resident resource in the printer and lasts across server sessions and printer power-off cycles. Resources may be captured by the printer if the resource is made capturable and if the printer has sufficient storage to save the resources. The print server 120 or the control unit 130 may delete such resources (based on a scheme such as a least recently used (LRU) basis) if the storage allocated for capturing is full and the current set of captured resources are not all deemed to be in active usage. However, those skilled in the art will recognize that objects in memory may be deleted according to several criteria, including deleting non-active, least-recently used objects first, deleting the largest objects first or deleting the smallest objects first, so that the capture memory is most effectively utilized. The printer operator may also be given some control over deleting captured resources.

The print server (PSF) manages resource objects. This includes querying the printer to see if the object is already captured, downloading the object if not, and deleting the object at the end of the print job. This allows the object, once downloaded, to be invoked multiple times, with different presentation semantics, without requiring another download.

Management of resources is triggered by the presence of a Map Data Resource (MDR) structured field in the MO:DCA™ (AFP) data stream. To uniquely identity resources which may be shared, captured or otherwise processed by the PSF, the present invention incorporates Object Identifiers (OIDs) as described above. An OID, as defined by the ISO naming conventions, will be unique for each resource or version of particular resource.

As summarized above, the present invention defines a print data stream structure that can be specified at the beginning of a document or job, or on any page boundary in a document or job, and that identifies complex resources that are required by the pages that follow. This structure is processed by a print server, which uses the resource references to download any missing resources before printing of the following pages is started.

Figure 3:
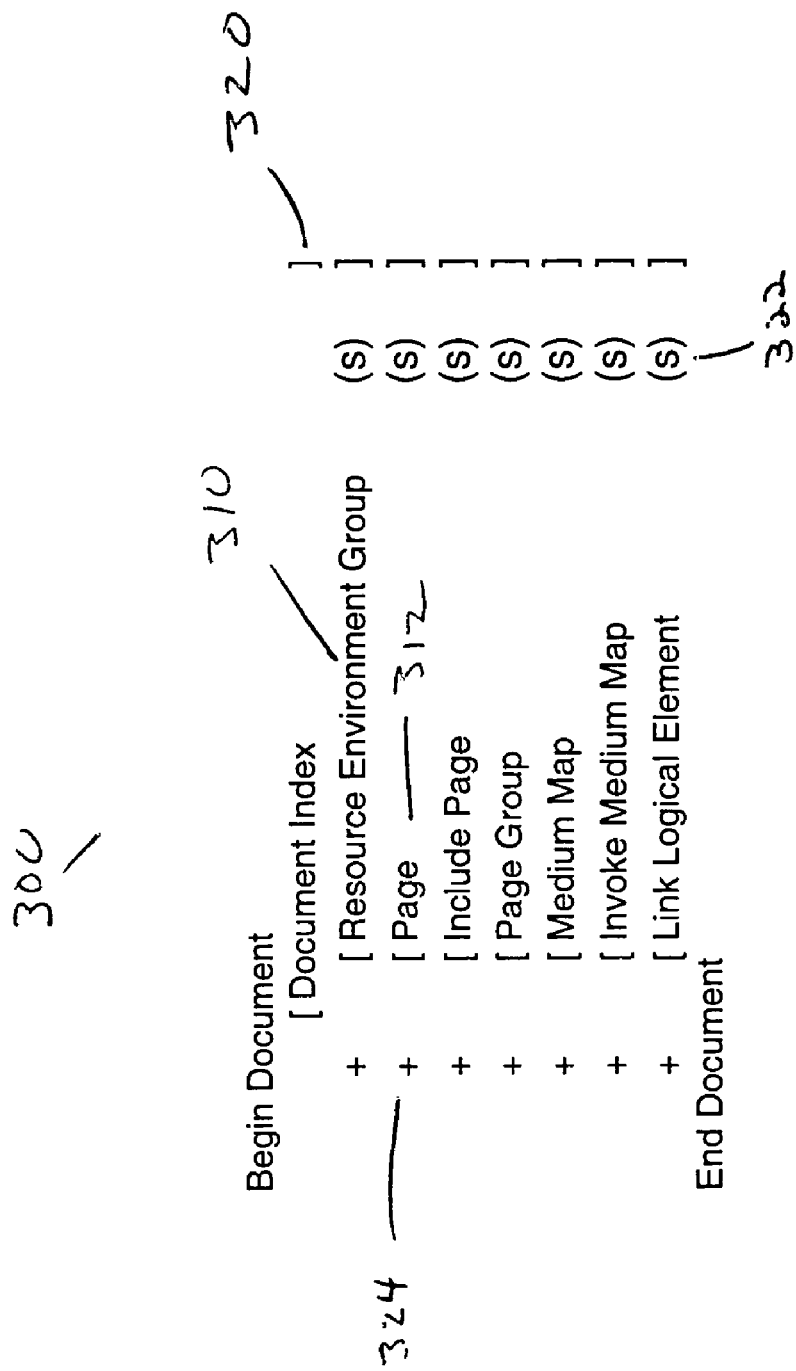
FIG. 3 illustrates a MO:DCA™ print document that includes data structure that identifies complex resources that are required by the pages that follow according to the present invention.

FIG. 3 illustrates a MO:DCA™ print document 300 that includes a data structure that identifies complex resources that are required by the pages that follow according to the present invention. The Resource Environment Group (REG) 310 is the data structure that identifies complex resources that are required by the pages that follow according to the present invention. The purpose of the REG 310 is to provide a structure for an early identification (or mapping) of complex resources.

The mapping of the REG 310 is provided early, i.e., it is specified in document state and can be placed ahead of the first page 312 in the document. This allows PSF resource management to be invoked to ensure that large, complex resources, such as color raster images, are downloaded to the printer before an attempt is made to print the first page. Because such resources can be large enough to prevent downloading within a page's print window, such a scheme is imperative for avoiding a page underrun and the ensuing blank pages.

In FIG. 3, the REG 310 is illustrated in the document state, i.e., it occurs between pages. The scope of the REG 310 is the pages that follow the REG 310, up to the next REG (not shown) which is a complete replacement for the current REG 310, or the end of the document, whichever occurs first. This allows the resources that were mapped (and possibly captured in the device) based on the current REG 310, to be deactivated if not mapped in a replacement REG.

The brackets 320 indicate that the REG is optional. As will be described below, the mapping of resources in a REG 310 is optional. Regardless of whether a REG 310 is specified, each resource required by a page must still be mapped in the page's Active Environment Group (AEG). The use of a REG 310 allows an AFP-generating application to ensure that by the time a page's AEG is processed, the most bandwidth and process-intensive resources required for the page have already been activated (and possibly pre-processed). The "(s)" symbol 322 indicates that the REG may be specified multiple times in a document. The "+" sign 324 indicates that the structure may appear in any order relative to structures that precede or succeed it and that are also marked with a "+" sign, otherwise the order is as listed.

Figure 4:
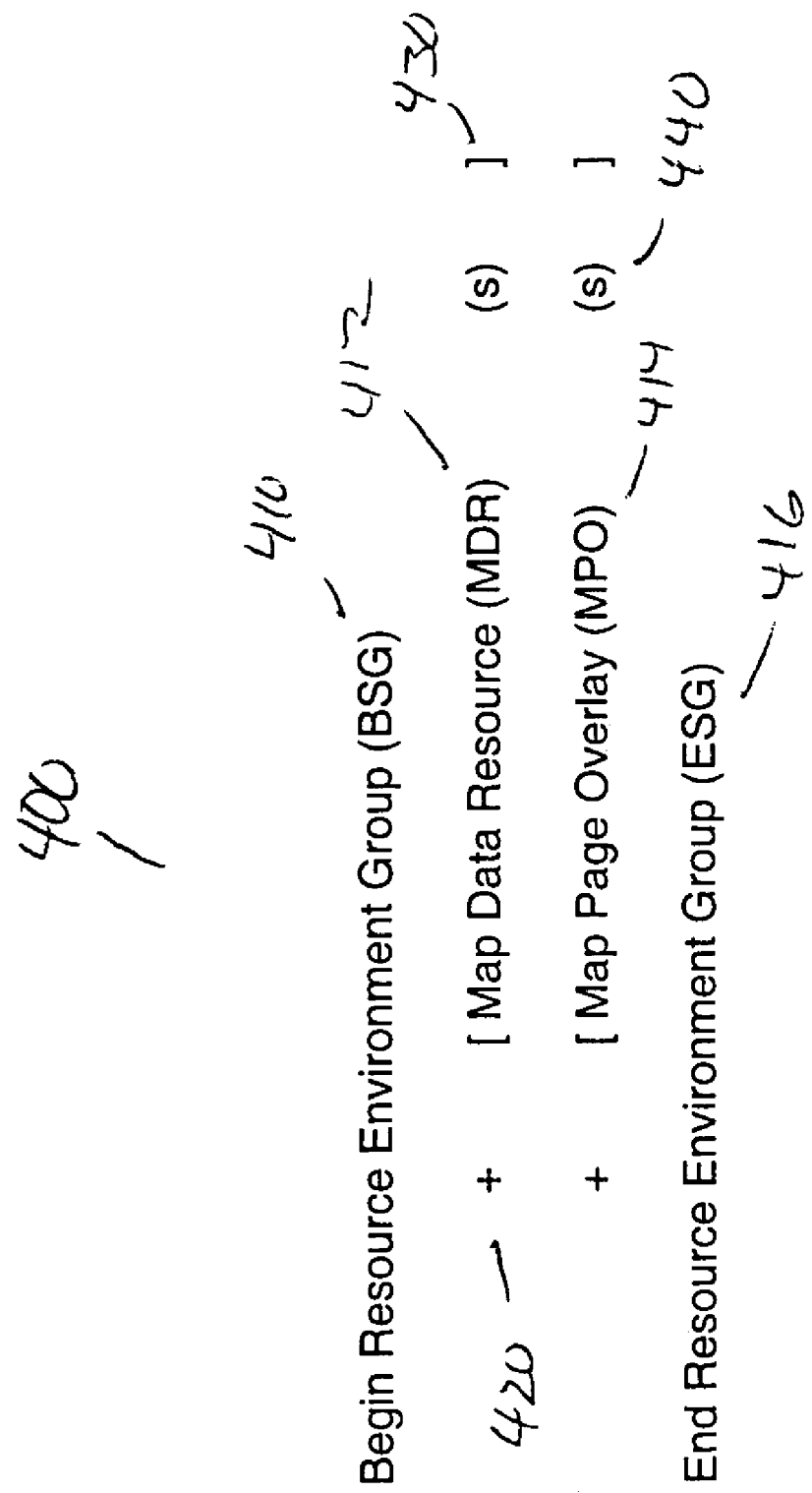
FIG. 4 illustrates the resource environment group fields that map resources according to the present invention.

FIG. 4 illustrates the REG structured fields 400 that map resources according to the present invention. The REG structured field includes an indication of the start of the REG (Begin Resource Environment Group (BSG)) 410, the Map Data Resource (MDR) structured field 412, the Map Page Overlay (MPO) structured field 414, and an indication of the end of the REG (End Resource Environment Group (ESG)) 416. The '+' signs 420 indicate that the two map structured fields can be specified in any order, the brackets 430 indicate that they are optional, and the "(s)" 440 indicates that they can occur multiple times. The MDR can be used to map data objects, such as images, that are referenced on the page; these objects are then processed as resources. The MDR can also be used to map objects that are required by data objects that are included on the page; such objects are also processed as resources and are referred to as secondary resources. For example, a page may contain a PostScript object that, in turn, requires an image for presentation. This image can be mapped in an MDR and is processed as a secondary resource. The MPO 414 can be used to map overlays. The mapping consists of a reference to the object and additional processing parameters.

Figure 5:
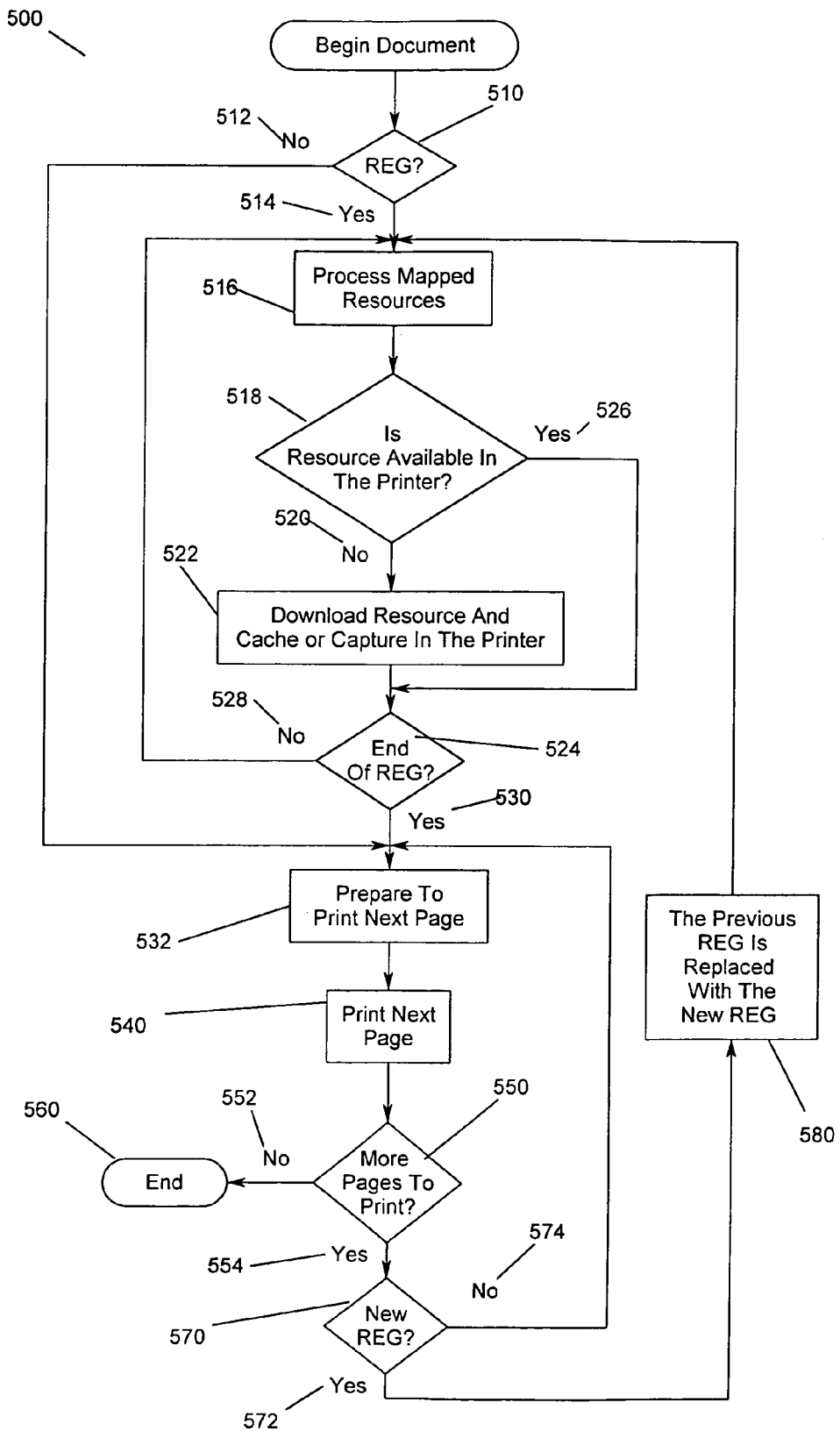
FIG. 5 illustrates the method of processing of a MO:DCA™ print document that includes a REG data structures mapping resources prior to printing according to the present invention.

FIG. 5 illustrates the method 500 of processing a MO:DCA™ print document that includes a REG data structure mapping resources prior to printing according to the present invention. The AFP print server determines whether there is a REG structure present in the document 510. If not 512, the AFP print server prepares the document for printing by ensuring that resource objects mapped in a page's Active Environment Group (AEG) are in the printer before the respective page is processed 530. If the REG is present in the document 514, all complex objects referenced by the REG are identified and PSF resource management is invoked to ensure that the complex resources are available to the printer before an attempt is made to print the first page.

Mapped resources are processed 516 and a determination is made whether the resource is available in the printer 518. If the resource is not available in the printer 520, the resource is downloaded and cached or captured in the printer 522. If the resource is available in the printer, the download and cache or capture is skipped 526. Then, a determination is made whether the end of the REG is encountered 524. If not at the end of the REG 528, the process loops back to process more mapped resources 516. If at the end of the REG 530, a page is prepared for printing in sequence 532 and printed 540.

The AFP print server then determines whether additional pages are to be printed 550. If not 552, the print job is terminated 560. If more pages are to be printed 554, the AFP print server determines whether a new REG is to be used 570. If a new REG is provided 572, the previous REG is replaced with the new REG and PSF resource management is invoked 516 to ensure that the complex resources associated with the new REG are available to the printer before an attempt is made to print the next page. If a new REG is not provided 574, the next page is simply prepared for printing in sequence 530 and printed 540.

Figure 6:
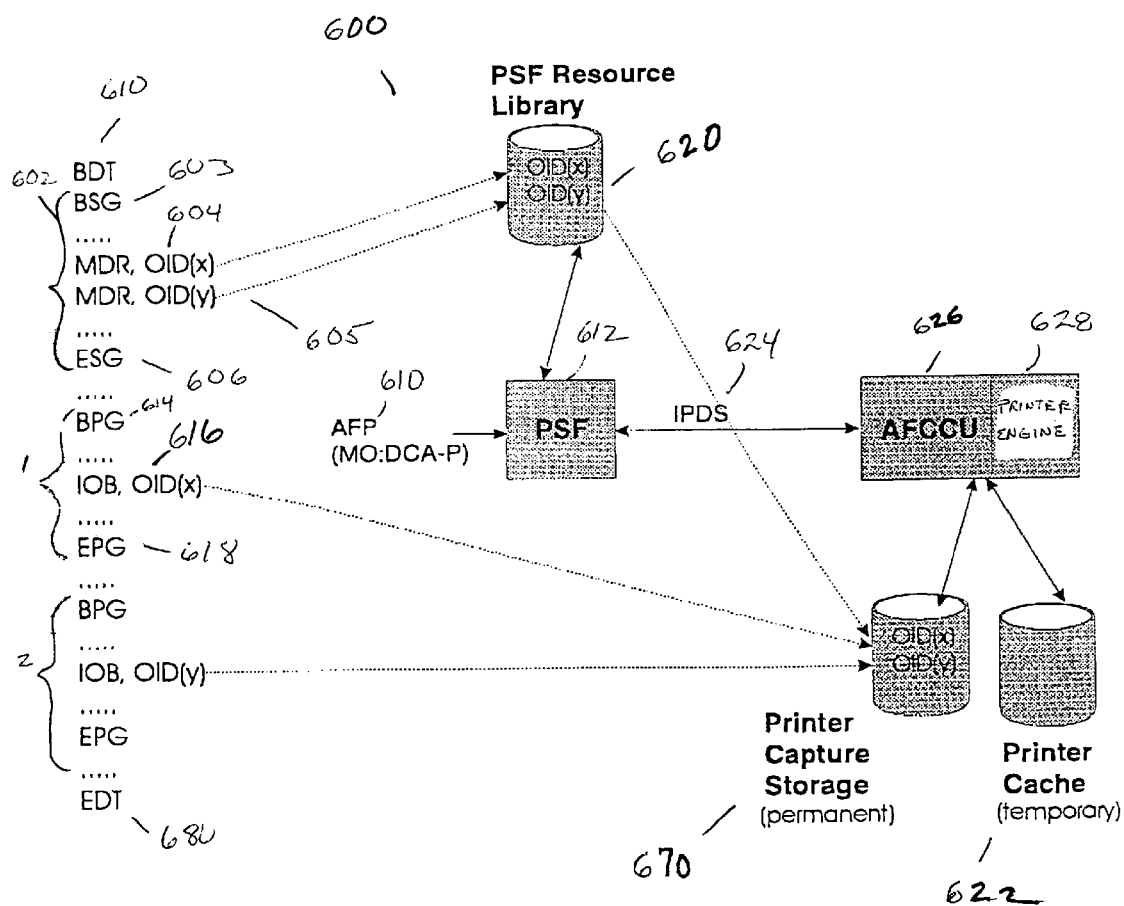
FIG. 6 illustrates object capture in the printer using the resource environment group according to the present invention.

FIG. 6 illustrates object capture in the printer 600 using the Resource Environment Group according to the present invention. In FIG. 6, the PSF 612 receives an AFP (MO:DCA)™ data stream 610 from a print application. The PSF 612 is provided images from the PSF resource library 620. The PSF resource library 620 provides images to the printer cache 622 or the printer capture storage 670 using the IPDS™ 624. The PSF 612 uses the Intelligent Printer Data Stream (IPDS™) printer protocol 624 to take full advantage of the advanced printer capabilities. The PSF 612 and the Advanced Function Common Control Unit (AFCCU) 626 (also referred to as the AFP control unit) communicate via the IPDS™ 624 to control the printer engine 628.

In FIG. 6, the document includes a Resource Environment Group (REG) 602. The REG is defined by the Begin Resource Environment Group (BSG) 603 that indicates the start of the REG. The REG in FIG. 6 includes two Map Data Resources (MDRs) 604, 605. The first MDR 604 references an image with an OID(x). The second MDR 605 references an image with an OID(y). The image from the PSF resource library is downloaded and captured in the printer capture storage 670. The AFCCU 626 may access images that are either captured 670 or cached 622.

BPG 614 signals the beginning of a page, IOB 616 signals the inclusion of an object, EPG 618 signals the end of a page and EDT 680 signals the end of the document. Thus, the AFP data stream defines a document having two pages (1 and 2). Each include an image object using an Include Object (IOB) structured field 616. For example, the IOB structured field 616 for the first page includes the image with OID(x), which has already been captured in the printer capture storage 670 during the processing of the REG 602. A similar process occurs for the image with OID(y) on the second page. Thus, both pages may be printed without waiting for images OID(x) and OID(y) to be downloaded because OID(x) and OID(y) were captured in the printer capture storage 670 during the processing of the REG 602. Note that a new REG may be provided between pages, e.g., between pages 1 and 2.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data structure disposed before a page in a document data stream for referencing and identifying resource objects, the data structure comprising a resource environment group disposed before a page group, the resource environment group referencing and identifying resource objects for at least the page group, the resource environment group providing an indication of resource objects to be made available prior to attempting to print the page.

2. The data structure of claim 1 wherein all of the resource objects of the document are made available prior to attempting to print the first page.

3. The data structure of claim 1 further comprising a mapping structure for identifying images, PostScript page objects, PDF page objects, PostScript resource objects or PDF resource objects.

4. The data structure of claim 3 further comprising a mapping structure for identifying overlay resource objects.

5. The data structure of claim 1 further comprising a mapping structure for identifying overlay resource objects.

6. The data structure of claim 1 further comprising at least one of a map data resource field for identifying images, PostScript page objects, PDF page objects, PostScript resource objects or PDF resource objects and a map page overlay structure for identifying overlays, wherein the order of the map data resource structure and the map page overlay structure is flexible.

7. A data stream defining a print document, the data stream comprising at least one data structure disposed before a page in the document data stream for referencing and identifying resource objects, the data structure comprising a resource environment group disposed before a page group, the resource environment group referencing and identifying resource objects for at least the page group, the resource environment group providing an indication of resource objects to be made available prior to attempting to print the page.

8. The data stream of claim 7, wherein the data structure is disposed at a beginning of a document before a first page to provide an indication of all resource objects that will be needed to print the document.

9. The data stream of claim 7 wherein all of the resource objects of the document are made available prior to attempting to print the first page.

10. The data stream of claim 7 further comprising a mapping structure for identifying images, PostScript page objects, PDF page objects, PostScript resource objects or PDF resource objects.

11. The data stream of claim 10 further comprising a mapping structure for identifying overlays.

12. The data stream of claim 7 further comprising a mapping structure for identifying overlays.

13. The data stream of claim 7 further comprising at least one of a map data resource structure for identifying images, PostScript page objects, PDF page objects, PostScript resource objects or PDF resource objects and a map page overlay structure for identifying overlays, wherein the order of the map data resource structure and the map page overlay structure is flexible.

14. A method of printing, comprising:
receiving a print request for printing a document;
generating a presentation data stream defining the document, the presentation data stream including at least one page group, the page group defining at least one page for printing; and
placing a resource environment group before a page group, the resource environment group referencing and identifying resource objects for at least the page group, the resource environment group providing an indication of resource objects to be made available prior to attempting to print the at least one page group.

15. The method of claim 14 wherein the page group comprises structures for defining a single page.

16. The method of claim 14 wherein the page group comprises structures for defining a plurality of pages.

17. The method of claim 14 wherein the resource environment group references and identifies resource objects for all page groups in the document.

18. The method of claim 14 wherein the placing comprises placing an Nth resource environment group before an Nth page group.

19. The method of claim 14 further comprising reading the resource environment group and ensuring all resource objects identified by the resource environment group are available to the printer before printing pages associated with the resource environment group.

20. The method of claim 19 wherein the ensuring comprises downloading any resources identified by the resource environment group that are not resident at the printer.

21. A method of printing, comprising:
receiving a print data stream comprising a resource environment group disposed before a page group, the resource environment group referencing and identifying resource objects for at least the page group, the resource environment group providing an indication of resource objects to be made available prior to attempting to print the page;
determining whether the print data stream includes a resource environment group;
downloading resource objects identified by the resource environment group when the print data stream includes a resource environment group; and
printing the pages defined by the print data stream.

22. The method of claim 21 wherein the determining further comprises determining whether the print data stream includes an Nth resource environment group associated with an Nth page group and the downloading further comprises downloading resource objects for the Nth page group identified by the Nth resource environment group when the print data stream includes an Nth resource environment group associated with an Nth page group.

23. A system for printing, comprising:
a document generator for generating a presentation data stream defining the document, the presentation data stream including at least one page group, the page group defining at least one page for printing and including a resource environment group before a page group, the resource environment group referencing and identifying resource objects for at least the page group, the resource environment group providing an indication of resource objects to be made available prior to attempting to print the at least one page group;
a print server, coupled to the document generator, the print server determining whether the print data stream includes a resource environment group and downloading resource objects identified by the resource environment group when the print data stream includes a resource environment group; and
a control unit, coupled to the print server, for printing the document using the resource objects downloaded by the print server.

24. The print system of claim 23 wherein the print server determines whether the print data stream includes an Nth resource environment group associated with an Nth page group and downloads resource objects for the Nth page group identified by the Nth resource environment group when the print data stream includes an Nth resource environment group associated with an Nth page group.

25. An article of manufacture comprising a program storage medium readable by a computer, the medium tangibly embodying one or more programs of instructions executable by the computer to perform a method for printing, the method comprising:
receiving a print request for printing a document;
generating a presentation data stream defining the document, the presentation data stream including at least one page group, the page group defining at least one page for printing; and
placing a resource environment group before a page group, the resource environment group referencing and identifying resource objects for at least the page group, the resource environment group providing an indication of resource objects to be made available prior to attempting to print the at least one page group.

26. An article of manufacture comprising a program storage medium readable by a computer, the medium tangibly embodying one or more programs of instructions executable by the computer to perform a method for printing, the method comprising:
receiving a print data stream;
determining whether the print data stream includes a resource environment group; and downloading resource objects identified by the resource environment group when the print data stream includes a resource environment group;

printing the pages defined by the print data stream.

* * * * *